W. B. BARNES.
GRINDER.
APPLICATION FILED JULY 25, 1912.

1,054,667.

Patented Mar. 4, 1913.

Witnesses

W. B. Barnes,
Inventor by C. A. Snow & Co.
Attorneys

UNITED STATES PATENT OFFICE.

WILLIAM B. BARNES, OF GREENFIELD, ILLINOIS.

GRINDER.

1,054,667.  Specification of Letters Patent.  Patented Mar. 4, 1913.

Application filed July 25, 1912. Serial No. 711,524.

*To all whom it may concern:*

Be it known that I, WILLIAM B. BARNES, a citizen of the United States, residing at Greenfield, in the county of Greene and State of Illinois, have invented certain new and useful Improvements in Grinders, of which the following is a specification.

The device forming the subject-matter of this application, is a grinder structure adapted to be applied to the frame of an ensilage cutter, for the purpose of sharpening the knives of the ensilage cutter, while the cutter is in operation, it being contemplated that, in practice, the ensilage cutter shall be provided with two sets of knives, one of which may be sharpened, while the other set is in use upon the cutter.

The invention aims to provide novel mechanism for actuating and for supporting a grinding element, and to provide novel means for connecting the grinder operatively with one of the rotatory shafts of the ensilage cutter.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
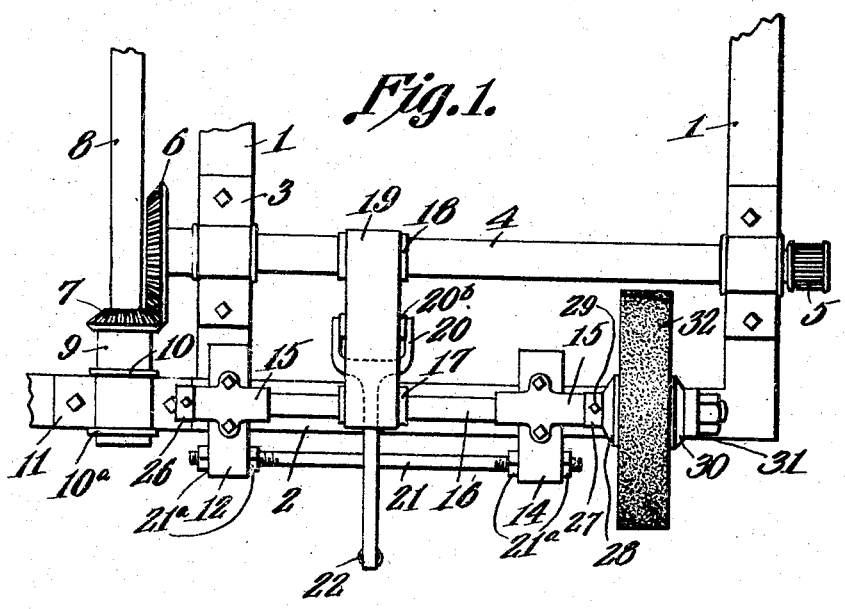
Figure 2:
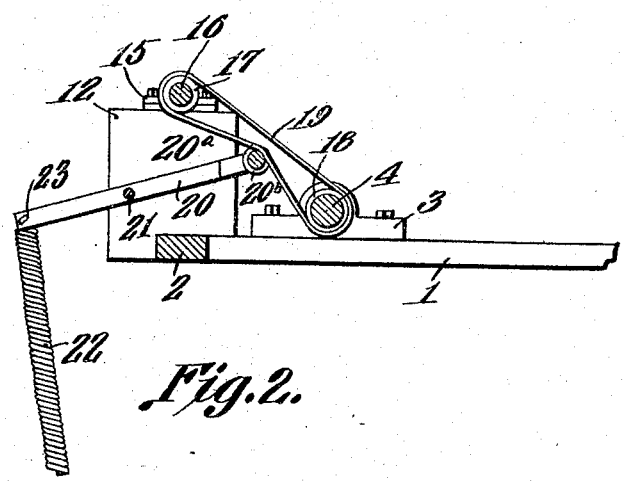

In the drawings,—Figure 1 shows the invention in top plan; and Fig. 2 is a transverse section.

In the accompanying drawings, the numerals 1 and 2 indicate portions of the frame of an ensilage cutter, the members 1 being parallel, and the member 2 being disposed at right angles to the members 1, the parts 1 and 2 being connected. Supported by the members 1 of the frame of the ensilage cutter are bearings 3 in which is journaled for rotation a shaft 4, provided at one end with a shrouded gear wheel 5 or with other suitable means whereby the shaft 4 may be operatively connected with the knives of the ensilage cutter. At its other extremity, the shaft 4 is equipped with a beveled pinion 6 meshing into a beveled pinion 7 carried by a shaft 8. The shaft 8 is a power-driven shaft, and constitutes means for operating the grinding mechanism, and for operating the knives of the ensilage cutter. Secured to the shaft 8, and, if desired, forming a part of the beveled pinion 7, is a collar 9 having a flange 10 which abuts against one side of a bearing 11 in which the shaft 8 is journaled for rotation, the bearing 11 being supported by the frame member 2. Secured to the extremity of the shaft 8 is a collar $10^a$, the collars $10^a$ and 10 constituting means for preventing the shaft 8 from having longitudinal movement in the bearing 11. Secured to the member 2 of the frame are supporting blocks 12 and 14, provided with bearings 15, in which is journaled for rotation, a shaft 16, to which is secured a pulley 17. Another pulley 18 is secured to the shaft 4, and about the pulleys 17 and 18 is passed a belt 19. A lever 20 extends transversely of the shafts 16 and 4, the lever 20 being fulcrumed upon a rod 21, extended through the supporting blocks 14 and 12, there being nuts $21^a$ threaded upon the rod 21, the nuts $21^a$ engaging opposite sides of the blocks 12 and 14. At one end, the lever 20 is bifurcated as indicated at $20^a$, the bifurcations $20^a$ supporting for rotation, a wheel $20^b$ which bears against the lower run of the belt 19, so that the parts 20 and $20^b$ constitute a belt tightener. The upper end of a retractile spring 22 is secured as shown at 23, to the free end of the lever 20, the lower end of the spring 22 being secured as shown at 24, to any suitable portion 25 of the frame of the ensilage cutter. Secured to one end of the shaft 16 is a collar 26 which prevents the shaft 16 from moving longitudinally in one direction in the bearings 15. Longitudinal movement of the shaft 16 in an opposite direction, is prevented by means of a collar 27 which, as indicated at 29, is secured to the shaft 16, the collar 27 being, if desired, formed integrally with a clamp member 28 which coöperates with another clamp member 30, held upon the shaft 16 by means of a nut 31 threaded upon the extremity of the shaft. Between the clamp members 28 and 30 is held a grinding wheel 32.

In practical operation, motion is transmitted from the drive shaft 8 through the intermeshing beveled pinions 6 and 7 to the shaft 4, the shrouded gear wheel 5 constituting a means for transmitting rotatory movement from the shaft 4 to the knife mechanism (not shown) of the ensilage cutter. When the shaft 4 is rotated, rotatory movement will be transmitted through the pulley 18, and from the pulley 18 by means of the belt 19, to the pulley 17 and to the shaft 16, the grinding wheel 32 being rotated. It will thus be seen that while the ensilage cutter is in operation, a separate set of knives may be sharpened upon the wheel 32, it being unnecessary to provide separate driving mechanism for actuating the wheel 32, and being equally unnecessary, to stop the cutting action of the machine, in order that the knives thereof may be ground, since one set of knives may be sharpened upon the wheel 32, while the other set of knives is employed in the cutting of the ensilage.

The spring 22 actuates the lever 20, the lever 20 being tilted upon the fulcrum rod 21, and the wheel 20$^b$ being thrust against the lower run of the belt 19, whereby the belt will be held sufficiently taut to connect the shaft 4 operatively with the shaft 16. The rod 21 exercises a double function. In the first instance, it constitutes a fulcrum for the lever 20 of the belt tightener, and in the second instance, coöperating with the nuts 21$^a$, it constitutes a means for spacing the blocks 12 and 14 so that the bearings 15 will coöperate properly with the collars 26 and 27 which are upon the shaft 16.

The grinding mechanism, it is to be noted, is so mounted in place upon the frame of the ensilage cutter that there will be practically no vibration in the grinding mechanism, when the same is in operation. The grinder, further, is not in the way of the cutting mechanism of the ensilage machine, and in no way interferes with the cutting of the ensilage.

Having thus described the invention, what is claimed is:—

In a device of the class described, spaced supporting members; bearings secured to the supporting members; a shaft journaled in the bearings; collars upon the shaft, adapted to engage the ends of the bearings to prevent the shaft from moving longitudinally in the bearings; a rod connecting the supports; means upon the rod engaging the supports to prevent the supports and the bearings from moving longitudinally of the shaft and to prevent the bearings from binding against the collars; a grinding wheel carried by the shaft; a second shaft; means for supporting the second shaft for rotation; a belt passed about the shafts; and a belt tightener fulcrumed upon the rod and engaging the belt.

In testimony whereof I affix my signature in presence of two witnesses.

WILLIAM B. BARNES.

Witnesses:
  Amos C. Ryan,
  Charles H. Westmeyer.